(12) United States Patent
Nakamura

(10) Patent No.: US 7,245,163 B2
(45) Date of Patent: Jul. 17, 2007

(54) OVERCURRENT LIMITING CONTROLLER

(75) Inventor: Koji Nakamura, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/185,752

(22) Filed: Jul. 21, 2005

(65) Prior Publication Data
US 2006/0077606 A1  Apr. 13, 2006

(30) Foreign Application Priority Data
Sep. 29, 2004 (JP) ............................. 2004-284060
Apr. 6, 2005 (JP) ............................. 2005-110077

(51) Int. Cl.
*H03K 3/00* (2006.01)

(52) U.S. Cl. ...................... 327/110; 327/427; 327/434; 327/435; 327/538; 327/541

(58) Field of Classification Search ..................... None
See application file for complete search history.

(56) References Cited

U.S. PATENT DOCUMENTS 4,367,722 A * 1/1983 Mizuno ...................... 123/644
7,038,415 B2 * 5/2006 Nakamura et al. .......... 318/471

FOREIGN PATENT DOCUMENTS

JP   A-2001-45790   6/2003

\* cited by examiner

*Primary Examiner*—Tuan T. Lam
*Assistant Examiner*—William Hernandez
(74) *Attorney, Agent, or Firm*—Posz Law Group, PLC

(57) ABSTRACT

A semiconductor device controller includes a current supply control unit for controlling a conduction state of a semiconductor device connected to a load in response to a control signal to supply current to the load, a current level judging unit for comparing one or more switching judgment values set in an area smaller than an overcurrent judgment value with current detected by a current detecting unit to carry out a current level judgment and a time constant changing unit for changing the circuit time constant of the input signal processing circuit in accordance with a judgment result by the current level judging unit.

8 Claims, 9 Drawing Sheets

OVERCURRENT LIMITING CONTROLLER

CROSS REFERENCE TO RELATED APPLICATIONS

This application is based upon, claims the benefit of priority of, and incorporates by reference the contents of, Japanese Patent Application No. 2004-284060 filed on Sep. 29, 2004 and Japanese Patent Application No. 2005-110077 filed on Apr. 6, 2005.

FIELD OF THE INVENTION

The present invention relates to a semiconductor device controller for controlling a semiconductor device for processing a pulse signal input as a current supply instruction from the outside on the basis of a circuit time constant to generate a control signal, and supplying current to a load in accordance with the control signal thus generated.

BACKGROUND OF THE INVENTION

In many cases, the value of a device for controlling a semiconductor device in accordance with an instruction signal input from the outside to supply current to a motor and drive the motor is enhanced by providing the device with such a protecting function that overcurrent (current extremely larger than stationary current) flowing when the motor is set to a lock state is detected and an outputting operation of the motor is restricted or stopped. In the driving device thus constructed, there is a case where when the voltage applied to the motor is drastically varied by the switching of the instruction signal supplied from the outside, the variation of the rotational number of the motor (=the electromotive force of the motor) cannot follow the variation of the applied voltage and inrush current flows transiently. Accordingly, it is supposed that the inrush current is erroneously judged as the above overcurrent.

As a technique of preventing the erroneous judgment of the overcurrent as described above is known a technique of reducing the inrush current by delaying the response of the motor applied voltage to the variation of an input signal, that is, gradually increasing the motor applied voltage (so-called slow start system). This system is effective to prevent the erroneous judgment of the protection function of the overcurrent, however, it is difficult to apply it to a system to which relatively high response is required. For example, supposing that the above system is applied to a system for driving a blower motor of an air conditioner mounted in a vehicle, a delay time occurs from the time point at which a user carries out an operation of changing an air blowing amount till the air blowing amount of the air conditioner is actually varied, and thus the commodity performance is lowered.

For example, JP-A-2001-45790 discloses a technique of allowing the inclination of the slow start to be set by two stages and switching the response so that the response is lowered for a fixed time from the start time of the motor and then the response is increased.

However, in the technique disclosed in the above publication, it is merely supposed that the switching operation of the response is carried out only at the start time of the motor, and the subsequent switching operation of the input signal is carried out with high response at all times. Accordingly, the erroneous judgment problem of the overcurrent protection function to the inrush current as described above can be never solved.

Furthermore, the easiness of the flow of the inrush current is also varied by the rating or type of the motor, the load state of the motor, the ambient temperature of the motor or the like. However, in the technique disclosed in the above publication, the response is lowered at the start of the motor at all times, and thus the start of the motor is delayed at all times irrespective of whether the inrush current flowing at the start of the motor actually occurs at such level that the erroneous judgment occurs.

SUMMARY OF THE INVENTION

In view of the foregoing, it is an object to provide a controller for a semiconductor device that can properly switch the response to variation of an input signal on the basis of the magnitude of current actually flowing in a load.

Accordingly, a semiconductor device controller includes a current level judging unit that compares one or more switching judgment values set in an area smaller than an overcurrent judgment value with current detected by a current detecting unit, and a time constant changing unit changes a circuit time constant of an input signal processing circuit in accordance with a judgment result of the current level judging unit.

That is, when a pulse signal input from the outside is greatly varied and a current amount to be supplied to a load is about to increase drastically, the signal processing response of the input signal processing circuit would be delayed if the circuit time constant is increased in accordance with the variation of the current concerned. Accordingly, the increase of the current amount to be supplied to the load is more moderated, and thus occurrence of inrush current can be suppressed. The switching judgment value is set in an area smaller than the overcurrent judgment value, and thus the overcurrent judging unit is prevented from malfunctioning. Furthermore, the circuit time constant is changed on the basis of the current amount to be supplied to the load, and thus the same operation can be also performed not only at the initial stage that the current supply to the load is started, but also under the subsequent stationary operating condition.

A judging result holding unit holds a judgment result of the current level judging unit for only a predetermined time, so that the judgment result can be prevented from being switched within a short time in response to the change of the circuit time constant and the operating state can be stabilized.

The overcurrent judging unit and the current level judging unit set the current judgment value on the basis of the voltage applied to the load. That is, the current flowing in the load when the semiconductor device is set to a conduction state is varied by variation of a power source voltage, ON-resistance of the semiconductor device or the like. Accordingly, if the current judgment value is set on the basis of the load applied voltage, the current judgment can be properly set in accordance with the voltage which is actually applied to the load.

When a current supply control unit carries out PWM control on the semiconductor device, a judgment result invalidating unit invalidates the judgment result based on the overcurrent judging unit and the current level judging unit during an intercept period of the semiconductor device. That is, no current flows in the load during the period when the semiconductor device is intercepted, and thus this period is improper to carry out the overcurrent judgment and the current level judgment. Accordingly, it can be avoided that the judgment result achieved during this improper period exerts an influence.

The current detecting unit carries out current detection by utilizing the ON-resistance of the semiconductor device, and thus it is unnecessary to separately provide a resistance element for current detection, so that the construction can be simplified.

The time constant changing unit is constructed by a resistance element inserted in a signal line in series, and a semiconductor device connected to the resistance element in parallel, so that the semiconductor device can be intermitted in accordance with the judgment result of the current level judging unit to increase/reduce the circuit time constant by only the amount corresponding to the resistance value of the resistance element.

The time constant changing unit constitutes the series circuit of the resistance element and the semiconductor element which are connected to the signal line in parallel. Therefore, by intermitting the semiconductor element in accordance with the judgment result of the current level judging unit, when the semiconductor device is conducted, the resistance element is connected to the signal line in parallel, whereby the circuit time constant can be reduced.

A signal output unit starts a time counting operation when the current level judging unit judges that the current detected by the current detecting unit exceeds the switching judgment value, and outputs a time constant changing signal every time a fixed time elapses. The time constant changing unit stepwise changes the circuit time constant of the input signal processing circuit every time the time constant changing signal is output. That is, when the current amount to be supplied to the load is about to increase drastically, the signal processing response of the signal processing circuit would be stepwise lowered if the circuit time constant is increased in a multiple-step mode. Accordingly, the signal processing response can be more smoothly switched, and the driving state of the load can be prevented from being drastically varied.

An instruction variation amount monitoring unit monitors the variation amount of a current supply instruction given from the outside, and the time constant changing unit changes the circuit time constant of the input signal processing circuit in accordance with a monitoring result. That is, when the current supply instruction input from the outside is greatly varied and the current amount to be supplied to the load is about to increase drastically, the signal processing response of the input signal processing circuit would be lowered if the circuit time constant is increased in accordance with the variation amount of the current supply instruction.

Accordingly, the increase of the current amount to be supplied to the load is moderated, and thus occurrence of the inrush current can be suppressed. The monitor of the variation amount of the current supply instruction is carried out independently of the overcurrent judgment, and no influence is exerted on the operation of the overcurrent judging unit. Accordingly, the same operation can be performed not only at the initial stage where the current supply to the load is started, but also under the subsequent stationary operation.

The instruction variation amount monitoring unit differentiates the control signal output from the input signal processing circuit by a differentiation circuit. An output voltage of the differentiation circuit is increased in connection with the increase of the variation amount of the current supply instruction, and thus when the output voltage exceeds a predetermined threshold value, a comparison circuit outputs a time constant changing instruction to the time constant changing unit. Accordingly, when the current amount to be supplied to the load is about to increase drastically, the circuit time constant of the input signal processing circuit can be changed.

The output state of an output state holding circuit holds the output state of the time constant changing instruction for a fixed time period, so that even when the output voltage of a differentiation circuit changes drastically, the circuit time constant of the input signal processing circuit can be prevented from being rapidly changed accordingly.

DETAILED DESCRIPTION OF THE PREFERRED EMBODIMENTS

Preferred embodiments will be described hereunder with reference to the accompanying drawings.

First Embodiment

Figure 1:
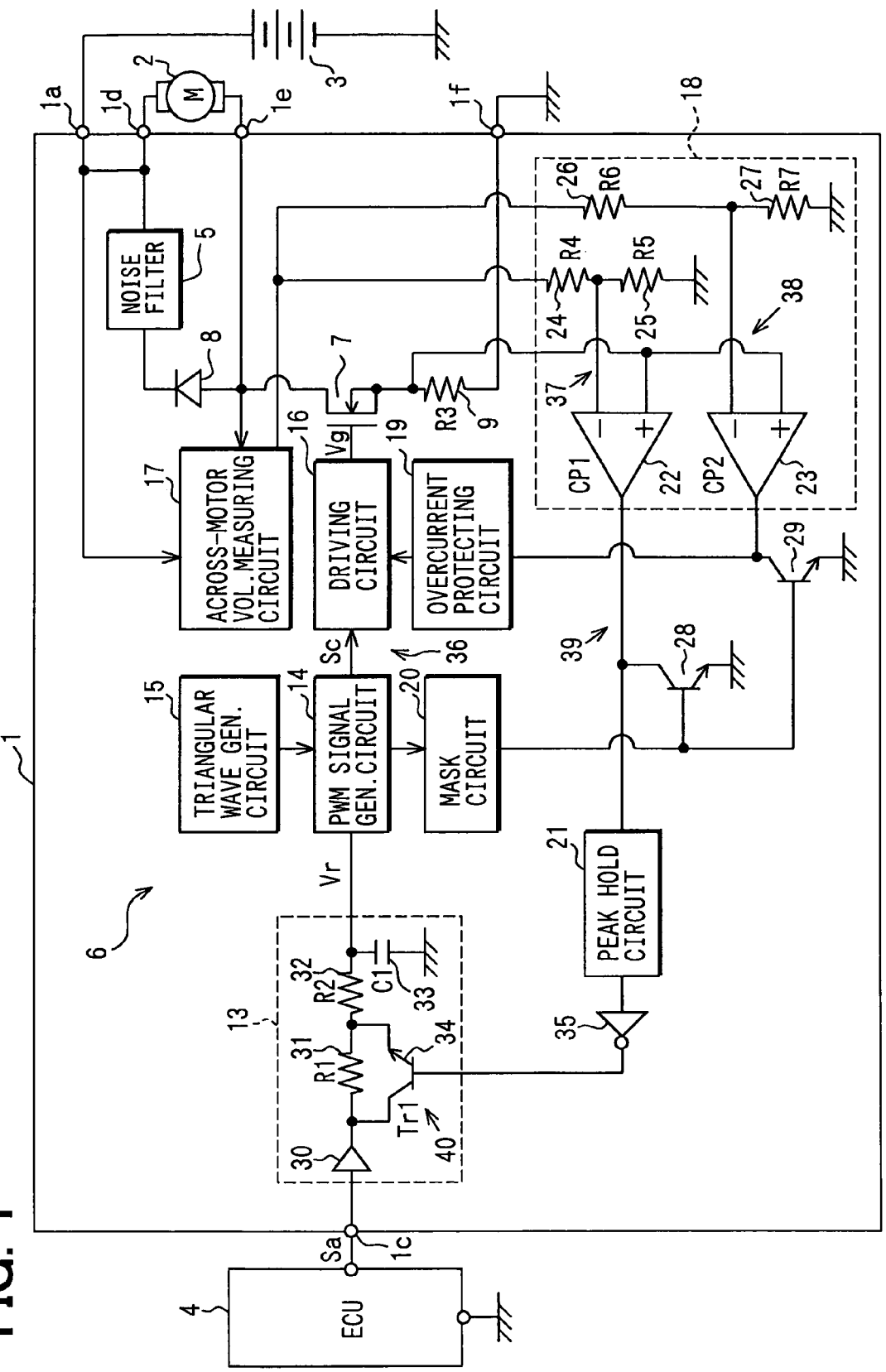
FIG. 1 is a functional block diagram showing the electrical construction of a motor driving device according to a first embodiment.

A first embodiment in which the controller is applied to a device for driving an air blowing fan motor of a heat exchange in a cooling system for a vehicle will be described with reference to FIGS. 1 to 4. FIG. 1 shows the electrical construction of a motor driving device. The motor driving device 1 drives an air blowing fan motor 2 (hereinafter referred to as motor 2), and it operates with a battery voltage supplied from a battery 3 to a terminal 1a as a power source voltage +B. Furthermore, an instruction signal Sa is supplied from an engine ECU 4 (Electronic Control Unit) to a terminal 1c. The instruction signal Sa is a PWM signal whose duty is varied in accordance with a voltage to be applied to the motor (load) 2.

The ECU 4 concentratively controls plural controllers for an engine such as fuel injection control, ignition timing control, idle rotational speed control, etc. As not shown, the ECU 4 is supplied with various signals such as a temperature signal of engine cooling water, an on/off signal of a magnet clutch for transmitting engine driving force to a compressor of an air conditioner, a refrigerant high-pressure signal indicating increase of the pressure of the air conditioner, etc., and carries out the engine control and the rotation control of the motor 2 by using these signals.

In the motor driving device 1 are provided a noise filter 5, a FET controller (semiconductor device controller) 6, an N-channel type MOSFET 7 (semiconductor element), and a diode 8 for reflow. Terminals 1d and 1e of the motor driving device are motor connection terminals, and the terminal 1d of these terminals is connected to the terminal 1a in the motor driving device 1. A terminal 1f is a ground terminal of the power system, the drain of MOSFET 7 is connected to the terminal 1e, and the source of FET 7 is connected to the terminal 1f through a current detecting resistance element (current detecting unit) 9.

In the motor driving device 1, the diode 8 whose polarity is shown in FIG. 1 and a noise filter 5 are connected to each other in series. The noise filter 5 is constructed by a π type filter comprising a reactor and two electrolytic capacitors (not shown), and it has a function of absorbing noise occurring at the switching time of MOSFET 7.

The FET controller 6 has an input signal processing circuit 13, a PWM signal generating circuit 14, a triangular wave generating circuit 15, a driving circuit 16, an across-motor voltage measuring circuit 17, a current judging circuit 18, an overcurrent protecting circuit (current limiting unit) 19, a mask circuit 20, a peak hold circuit judgment result holding unit) 21, etc. The construction of each circuit is as follows.

The input signal processing circuit 13 receives and integrates a PWM signal Sa (hereinafter referred to as DUTY signal for discrimination) which is transmitted from the ECU 4 and has a carrier wave frequency of about several tens Hz to several kHz to generate an instruction motor voltage (control signal) Vr. The PWM signal generating circuit 14 is designed to control the PWM duty of the PWM signal Sc on the basis of the instruction motor voltage Vr. That is, in the PWM signal generating circuit 14, the instruction motor voltage Vr and the triangular wave signal as the carrier wave (the frequency is set to about 19 kHz, for example) output from the triangular wave generating circuit 15 are compared with each other in the comparator to generate and output a PWM signal sc. The driving circuit 16 receives the PWM signal Sc and outputs a gate voltage Vg to MOSFET 7.

Figure 2:
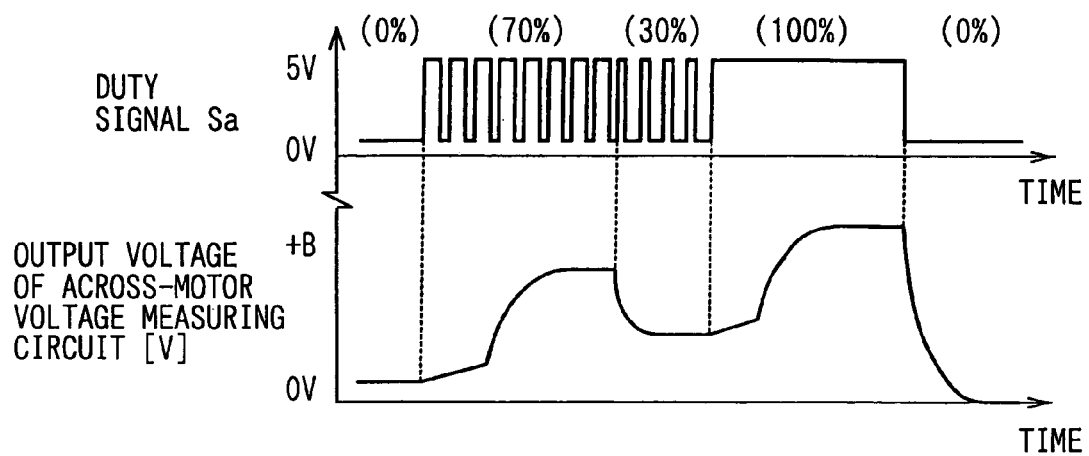
FIG. 2 is a diagram showing variation of an output voltage of an across-motor voltage measuring circuit in connection with variation of DUTY signal Sa.

The across-motor voltage measuring circuit 17 (corresponding to the motor voltage detecting unit) detects the average value of the voltage Ve between the terminal 1d (terminal 1a) and the terminal 1e, and outputs the voltage achieved by reducing the voltage Ve at the terminal 1e from the voltage +B of the battery 3, that is, outputs an across-motor voltage (i.e., a voltage applied across the motor). Under the state that MOSFET 7 is in the OFF-state, the across-motor voltage is equal to +B. However, if MOSFET 7 is turned on, the across-motor voltage is set to a voltage around 0V which corresponds to the ON-resistance of MOSFET 7 or the like. FIG. 2 shows variation of the output voltage of the across-motor voltage measuring circuit 17 which corresponds to the variation of the DUTY signal Sa.

The current judging circuit 18 is equipped with two comparators 22 (CP1), 23(CP2). The non-inverting input terminals of these comparators 22, 23 are commonly connected to the source of MOSFET 7, and the inverting input terminals thereof are connected to the common connection point of voltage dividing resistors 24 and 25 and the common connection point of voltage dividing resistors 26 and 27, respectively.

The comparator 23 carries out an overcurrent judgment, and the comparator 22 carries out a slow start judgment.

Figure 3:
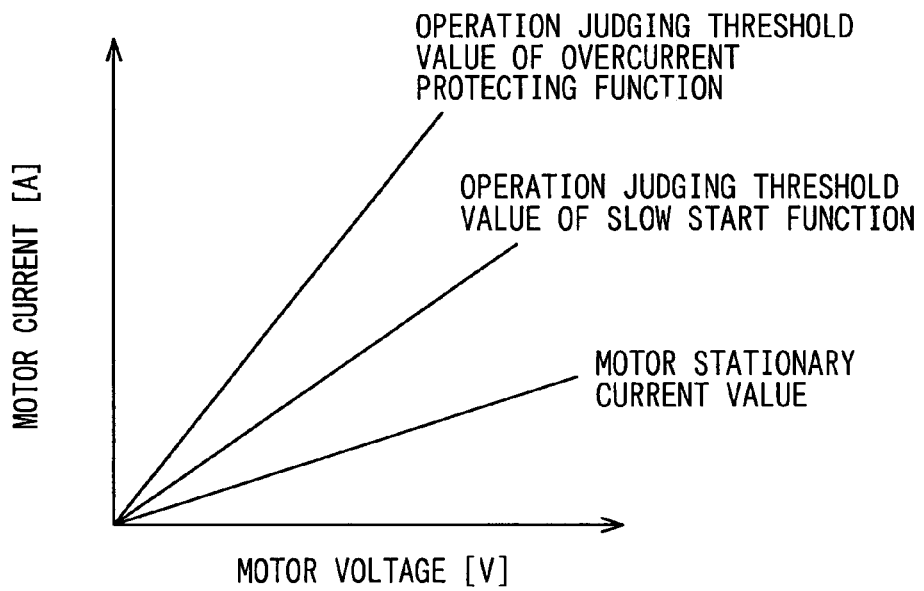
FIG. 3 is a diagram showing the relationship between an overcurrent judgment value and a slow start judgment value.

That is, the voltage-divided potential achieved by the voltage-dividing resistors 26 and 27 corresponds to the overcurrent judgment value, and the voltage-divided potential achieved by the voltage-dividing resistors 24 and 25 is set to a slow start judgment value (switching judgment value) which is lower than the overcurrent judgment value (see FIG. 3).

The output terminal of the comparator 23 is connected to the input terminal of the overcurrent protecting circuit 19, and the output terminal of the comparator 22 is connected to the input terminal of the peak hold circuit 21. Furthermore, the collectors and emitters of the NPN transistors 28, 29 are connected between the output terminals of the comparators 22, 23 and the ground, and the base of the transistors 28, 29 is connected to the output terminal of a mask circuit 20. The mask circuit 20 is constructed by an inverter gate, for example, and the transistors 28, 29 are turned on during a period when the PWM signal is set to low level and MOSFET 7 is shut off, whereby the output signals of the comparators 22, 23 are forcedly set to low level and invalidated.

The comparator 23 outputs a high level signal when the current flowing in MOSFET 7 becomes equal to or higher than the overcurrent judgment value, and the overcurrent protecting circuit 19 receives the signal concerned to limit the current flowing through MOSFET 7 (or stop the driving of MOSFET 7) or the like, thereby performing the overcurrent protecting operation. On the other hand, when the current flowing in MOSFET 7 becomes equal to or higher than the slow start judgment value, the comparator 22 outputs a high level signal.

The peak hold circuit 21 receives the output signal of the comparator 22 for peak-holding and has a function of suppressing the circuit time constant switching processing of the input signal processing circuit 13 described below from being destabilized because the output signal of the comparator 22 is hunted.

A series circuit comprising a buffer 30 and resistance elements 31 and 32 is connected between the input terminal and output terminal of the input signal processing circuit 13, and a capacitor 33 is connected between the output terminal and the ground. That is, these elements constitute an integrating circuit. The collector and emitter of the NPN transistor 34 are connected to the ends of the resistance element 31, and the base of the transistor 34 is connected to the output terminal of the peak hold circuit 21 though an inverter gate 35. Accordingly, under the state that the transistor 34 is turned off, the circuit time constant of the input signal processing circuit 13 is increased by the amount corresponding to the resistance value R1 of the resistance element 31 (τ1=(R1+R2)×C1), and if the transistor 34 is turned on, the circuit time constant is switched to be reduced (τ2=R1×C1).

In the above construction, the PWM signal generating circuit 14, the triangular wave generating circuit 15 and the driving circuit 16 constitute the current supply control unit 36, the comparator 22 and the voltage-dividing resistors 24 and 25 constitute the current level judging unit 37, the comparator 23 and the voltage-dividing resistors 26 and 27 constitute the overcurrent judging unit 38, the mask circuit 20 and the transistors 28 and 29 constitute the judgment result invalidating unit 39, and the resistance element 31 and the transistor 34 constitute the time constant changing unit 40.

Figure 4:
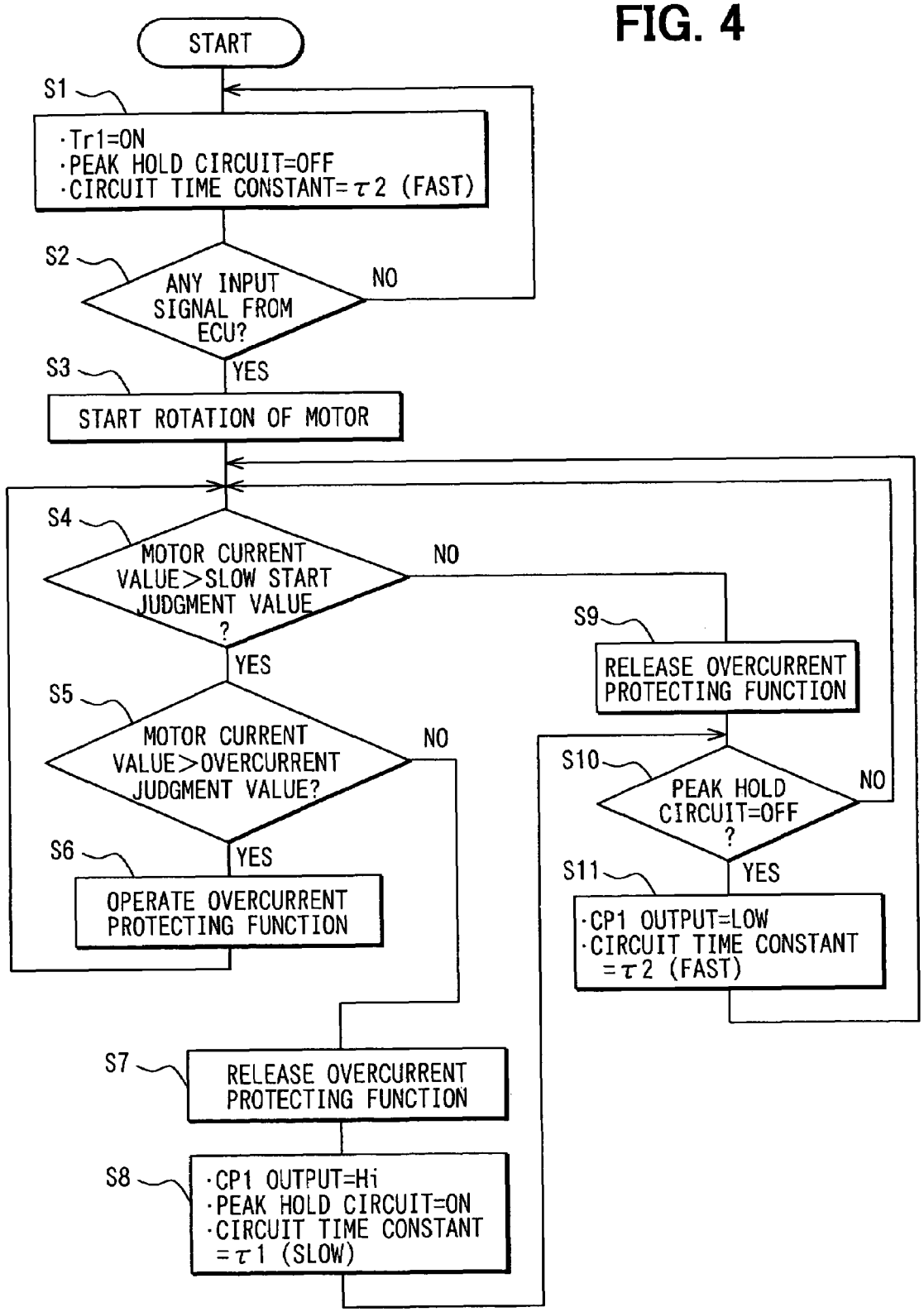
FIG. 4 is a flowchart showing the circuit operation of an FET controller.

Next, the action of this embodiment will be described with reference to FIG. 4. FIG. 4 is a flowchart showing the circuit operation of the FET controller 6 in the motor driving device 1. The output signal of the comparator 22 is set to low level until the time point when the PWM signal Sc is input from the ECU 4, and thus the transistor 34 is turned on. Accordingly, the circuit time constant of the input signal processing circuit 13 is set to τ2 (step S1).

At the instantaneous time when the PWM signal Sc is input (step S2, "YES") and the motor 2 starts to rotate, starting current flows into MOSFET 7 (step S3). Therefore, the comparator 22 outputs a high-level signal, the transistor 34 is turned off and the circuit time constant is switched to τ1. The switching of the circuit time constant is finished within an extremely short time, and thus the circuit time constant in the start time of the motor 2 can be regarded as being substantially equal to τ1 (steps S4, S5, S7, S8).

When the rotational number of the motor 2 is very slowly increased under the state that the circuit time constant is equal to τ1 (slow start), the current flowing in the motor 2 is reduced to the slow start judgment value of the comparator 22 or less (step S4, "NO") and the hold time set in the peak hold circuit 21 elapses (step S10, "YES"), the transistor 34 is turned on, and the circuit time constant of the input signal processing circuit 13 is switched to τ2 (step S11).

Accordingly, the circuit time constant of the input signal processing circuit 13 is reduced after the slow start operation is carried out at the start time of the motor 2, and thus the response to the variation of the PWM signal Sc is enhanced. Even under the stationary operation state, if inrush current is about to occur due to sharp variation of the PWM signal Sc, the current flowing through MOSFET 7 exceeds the slow start judgment value (overcurrent judgment value: step S4, "YES", step S5, "NO"), and the circuit time constant is switched to τ1 (step S8), so that occurrence of the inrush current is suppressed.

When the overcurrent protecting function of step S6 is working as described later at the time point when "NO" is judged at any one of the steps S4 and S5, the protecting function concerned is released in steps S7 and S9.

Furthermore, when the current flowing through MOSFET 7 exceeds the overcurrent judgment value (step S5, "YES"), the output signal of the comparator 23 is set to high level, and the overcurrent protecting circuit 19 operates so that the ON duty of MOSFET 7 is limited to be extremely reduced (step S6).

According to the embodiment described above, the slow start judgment value smaller than the overcurrent judgment value is compared with the current flowing through MOSFET 7 by the comparator 22, and the conduction of the transistor 34 is controlled in accordance with the judgment result of the comparator to change the circuit time constant of the input signal processing circuit 13.

Accordingly, when the DUTY signal Sa input from the ECU 4 is greatly varied and thus the current amount to be supplied to the motor 2 is about to increase drastically, the circuit time constant is switched so that the signal processing response of the input signal processing circuit 13 is lowered, and thus occurrence of inrush current can be suppressed. Since the circuit time constant is changed on the basis of the current amount to be supplied to the motor 2, the comparator 23 for carrying out the overcurrent judgment does not malfunction, and the slow start operation can be likewise performed not only at the initial stage where the current supply to the motor 2 is started, but also under the subsequent stationary operating condition.

Furthermore, the output signal level of the comparator 22 is held for only a predetermined time by providing the peak hold circuit 21. Therefore, the judgment result of the comparator 22 is prevented from being switched within a short time in accordance with the change of the circuit time constant in the input signal processing circuit 13, whereby the operating state can be stabilized. The current judgment values in the comparators 22, 23 are set on the basis of the potential achieved by dividing the across-motor voltage, and the current judgment can be properly carried out in accordance with the actual driving state of the motor 2.

Furthermore, the PWM signal generating circuit 14 is designed to carry out PWM control on MOSFET 7, and the judgment results of the comparators 22, 23 are invalidated during the period when MOSFET 7 is shut off by the mask circuit 22 and the transistors 28 and 29. Therefore, it can be avoided that the judgment is carried out during a period which is improper to carry out the overcurrent judgment and the current level judgment. In addition, the time constant changing unit 40 is constructed by the resistance element 31 inserted in the signal line in series and the transistor 34 connected to the resistance element 31 in parallel. Therefore, by intermitting the transistor 34 in accordance with the judgment result of the comparator 22, the circuit time constant of the input signal processing circuit 13 can be increased/reduced by only the amount corresponding to the resistance value of the resistance element 31.

Second Embodiment

Figure 5:
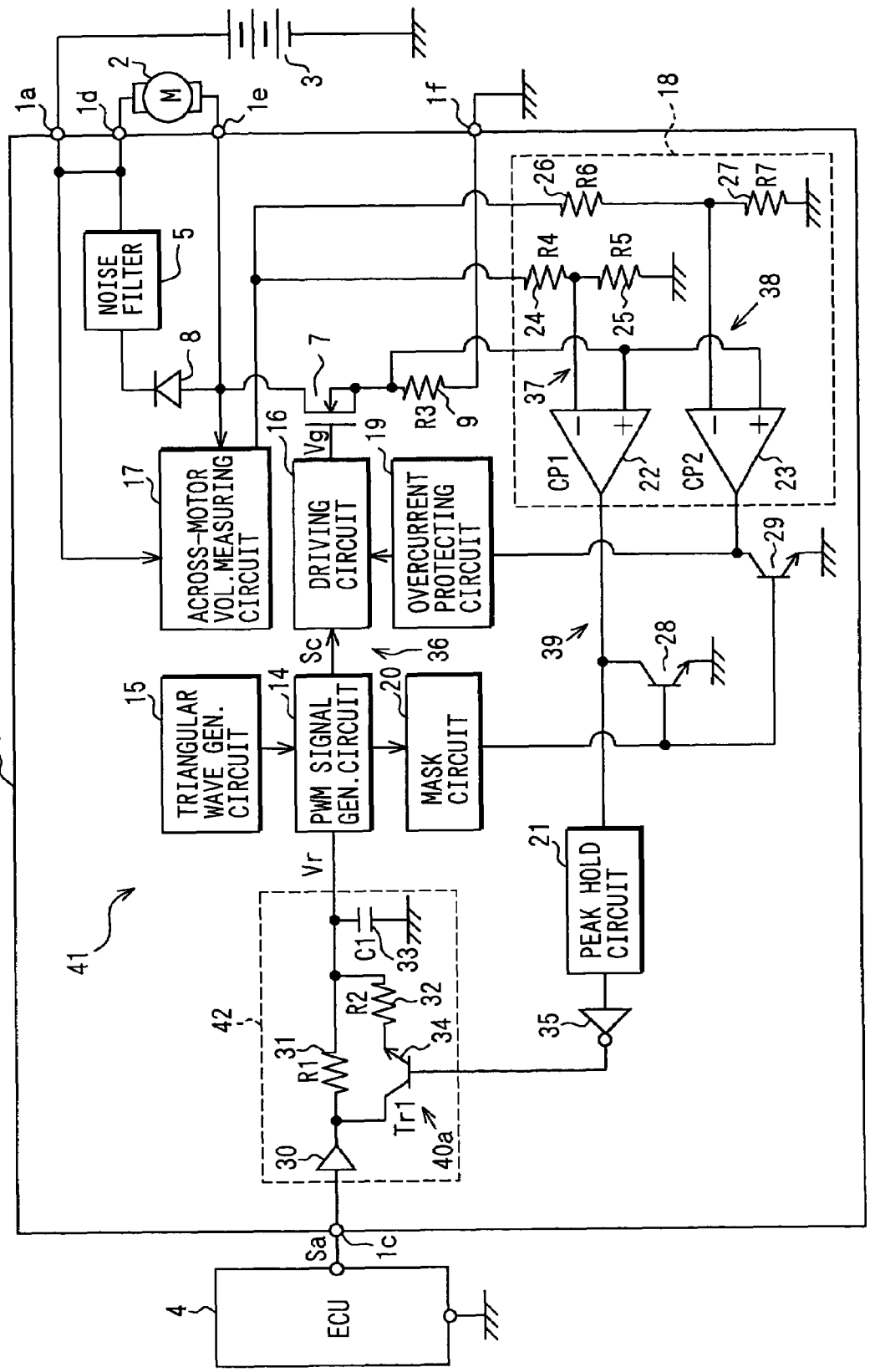
FIG. 5 is a diagram showing a second embodiment which corresponds to FIG. 1.

FIG. 5 shows a second embodiment. In FIG. 5, the same parts as in the first embodiment are represented by the same reference numerals, and the description thereof is omitted. Only the different parts from the first embodiment will be described hereunder. A FET controller 41 of the second embodiment by which the FET controller 6 is replaced is achieved by replacing the input signal processing circuit 13 with an input signal processing circuit 42. That is, in the input signal processing circuit 13, the resistance elements 31 and 32 are inserted in the input signal in series. However, in the input signal processing circuit 42, the series circuit comprising the transistor 34 and the resistance element 32 is connected to the resistance element 31 in parallel. These elements constitute a time constant switching unit 40a, and the other construction is the same as the first embodiment.

According to the second embodiment thus constructed, under the state that the transistor 34 is turned off, only the resistance value R1 of the resistance element 31 contributes to the circuit time constant. If the transistor 34 is turned on, the resistance element 32 is connected to the resistance element 31 in parallel, and thus the parallel resistance value of both the resistance elements 31 and 32 contributes to the circuit time constant, so that the circuit time constant is reduced. Accordingly, the same effect as the first embodiment can be achieved.

Third Embodiment

Figure 6:
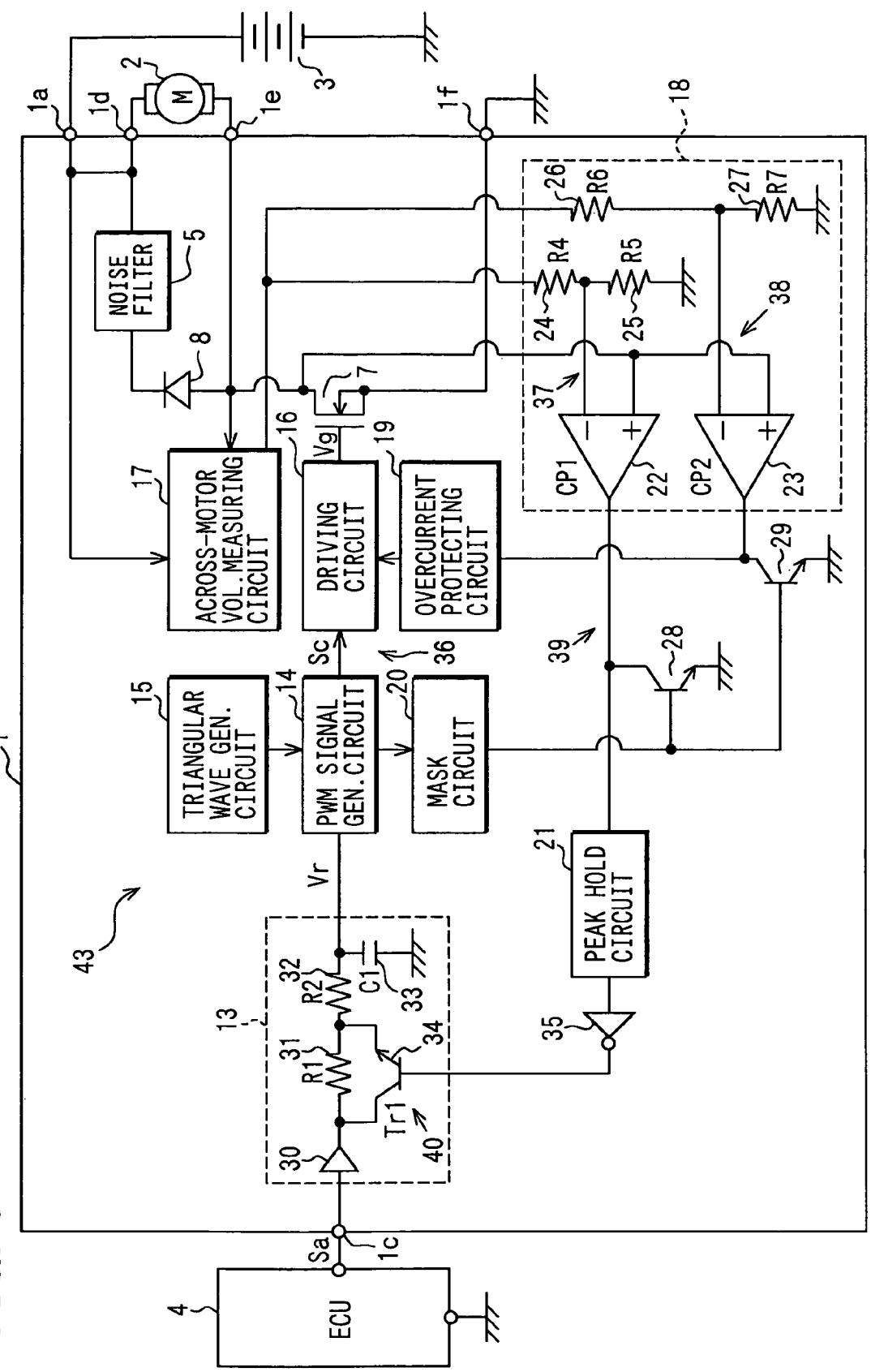
FIG. 6 is a diagram showing a third embodiment which corresponds to FIG. 1.

FIG. 6 shows a third embodiment, and only the different parts from the first embodiment will be described hereunder. In an FET controller 43 of the third embodiment, the resistance element 9 for current detection is eliminated, and the non-inverting input terminals of the comparators 22 and 23 are connected to the drain of MOSFET 7. According to the third embodiment thus constructed, the current flowing in the motor 2 can be detected by utilizing the ON-resistance when FET (current detecting unit) 7 is turned on in place of the resistance element 9. Accordingly, the construction can be more simplified.

Fourth Embodiment

Figure 7:
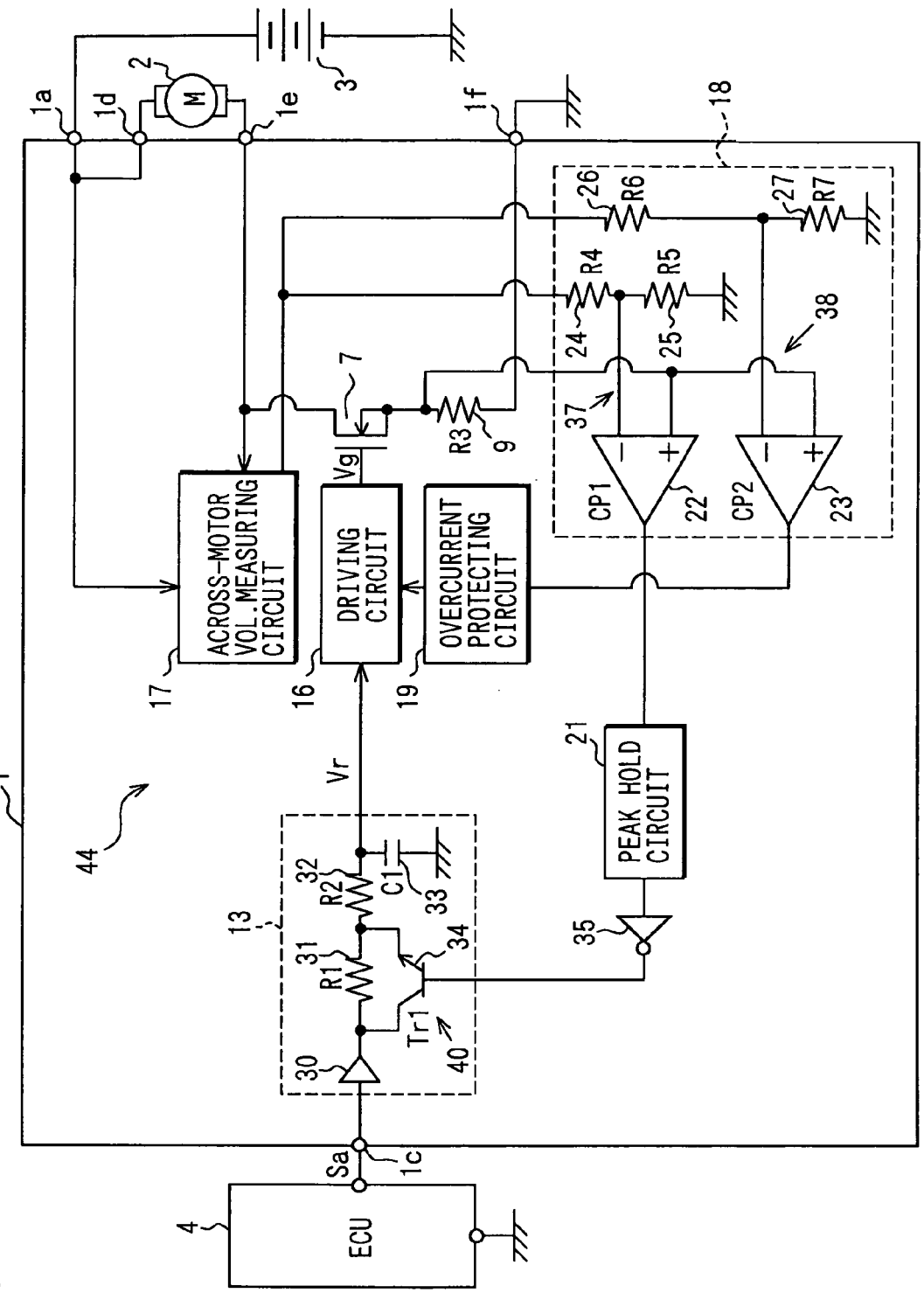
FIG. 7 is a diagram showing a fourth embodiment which corresponds to FIG. 1.

FIG. 7 shows a fourth embodiment of the invention, and only different parts from the first embodiment will be described. In an FET controller 44 of the fourth embodiment, the PWM signal generating circuit 14 and the triangular wave generating circuit 15 are eliminated, and MOSFET 7 is linearly driven through the driving circuit (current supply control unit) 16. Accordingly, the noise filter 5, the diode 8 and the mask circuit 20 and the transistors 28 and 29 constituting the judgment result invalidating unit 39 are eliminated. The other construction is the same as the first embodiment. According to the fourth embodiment thus constructed, the same effect as the first embodiment can be also achieved in the construction that the motor 2 is linearly driven.

Fifth Embodiment

Figure 8:
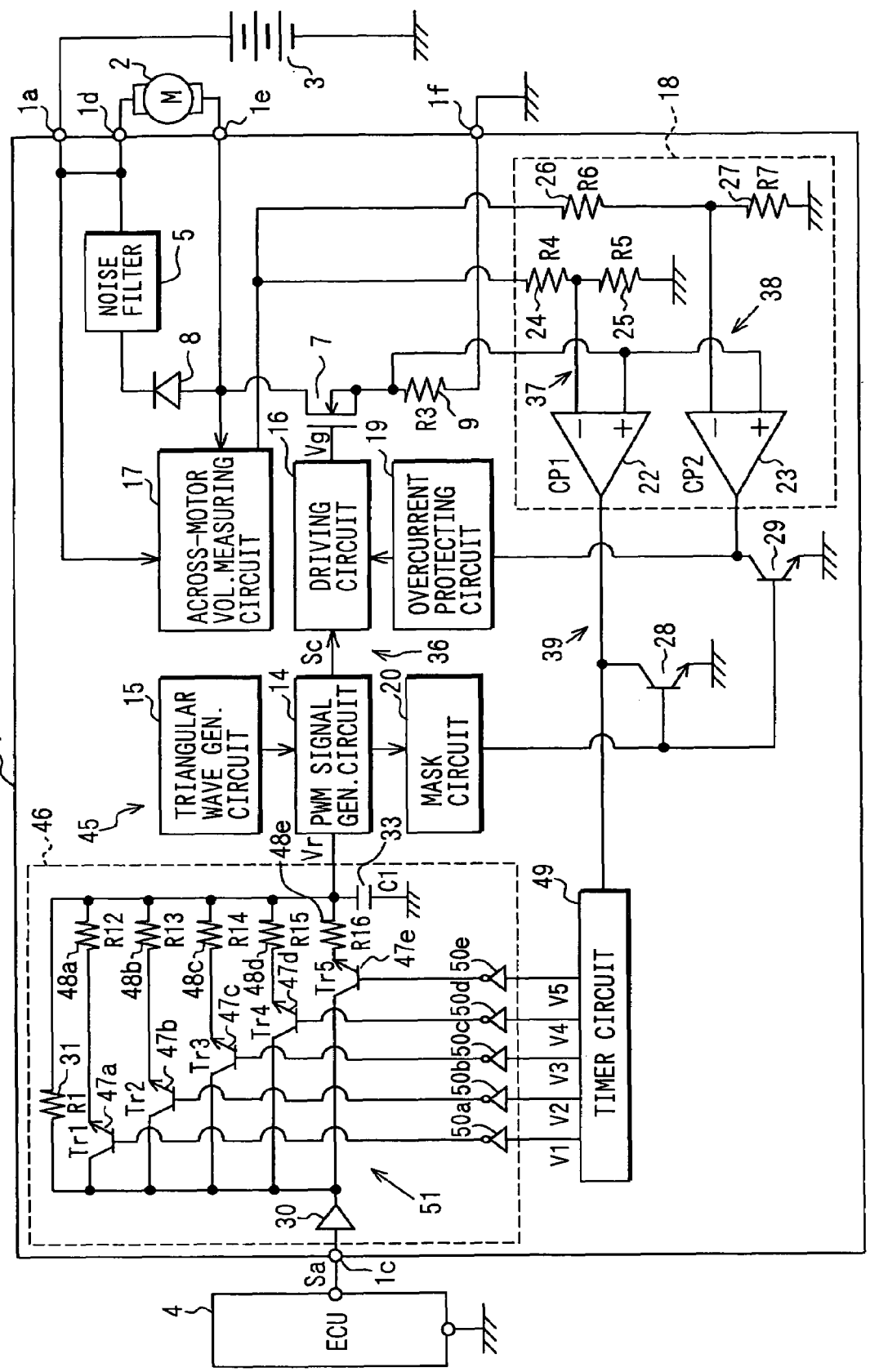
FIG. 8 is a diagram showing a fifth embodiment which corresponds to FIG. 1.
Figure 9:
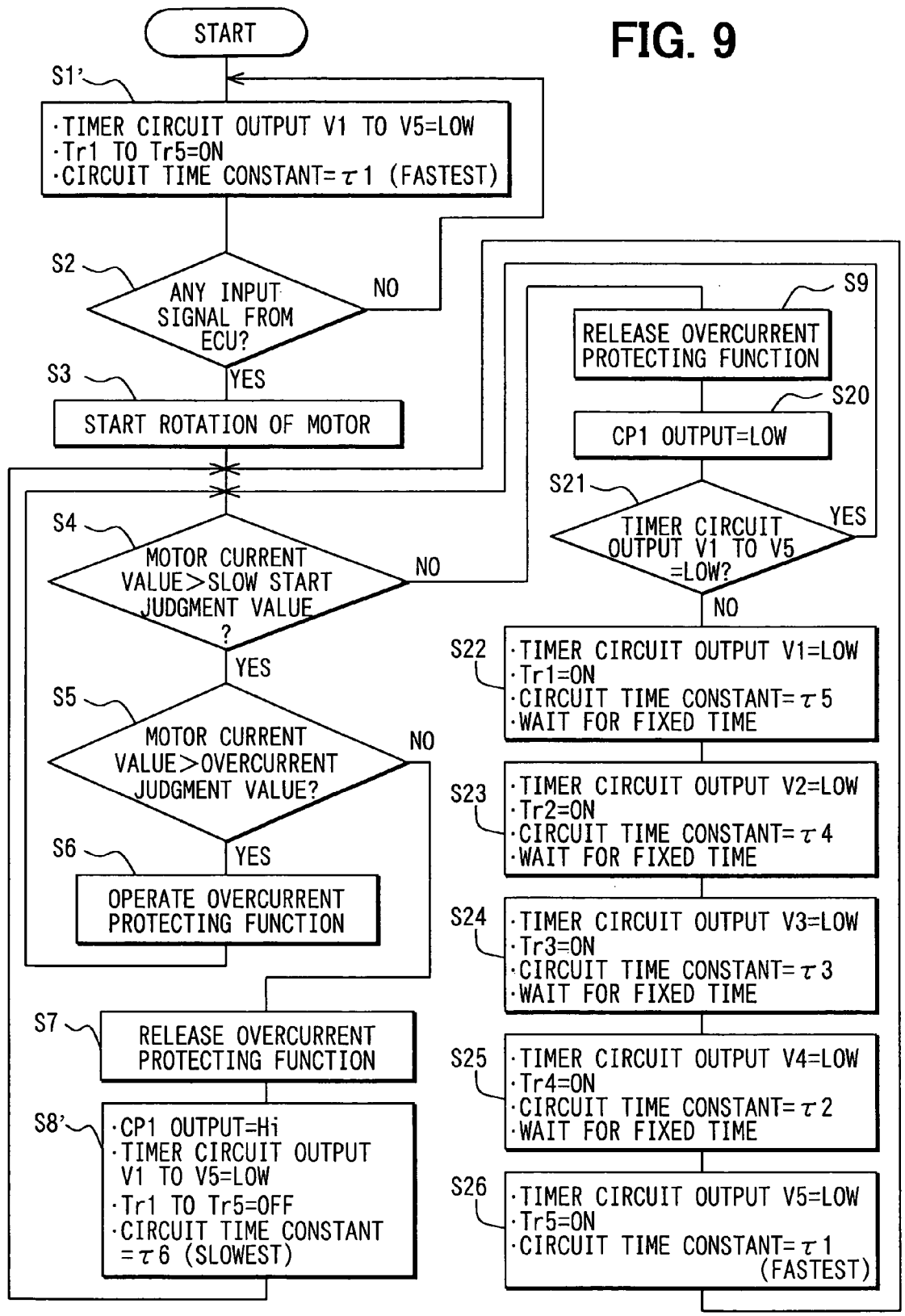
FIG. 9 is a flowchart showing the circuit operation of fifth embodiment.

FIGS. 8 and 9 show a fifth embodiment according to the invention, and only the different parts form the first and second embodiments will be described. In an FET controller (semiconductor device controller) 45 of the fifth embodiment, the peak hold circuit 21 and the inverter gate 35 are eliminated from the FET controller 41 of the second embodiment. In an input signal processing circuit 46 used in place of the input signal processing circuit 42, a series circuit comprising five pairs of NPN transistors 47($a$ to $e$, Tr1 to Tr5) and resistance elements 48($a$ to $e$) is connected to the resistance element 31 in parallel.

The output terminal of the comparator 22 is connected to the input terminal of a timer circuit (signal output unit) 49, and five output terminals V (1 to 5) of the timer circuit 49 are connected to the bases of the transistors 47($a$ to $e$) through five inverter gates 50($a$ to $e$). The transistors 47$a$ to 47$e$ and the resistance elements 48$a$ to 48$e$ correspond to the time constant changing unit 51.

The inner logic of the timer circuit 49 is set as follows. That is, the timer circuit 49 is initialized under the state that the output level of the comparator 22 is set to the low state at the reset time, and all the five output terminals V1 to V5 are set to low level. When the output level of the comparator 22 is varied from the above state to the high state, all the output terminals V1 to V5 are set to high level, and when the output level of the comparator 22 is further varied from the above state to the low state, the time counting operation is started with the above variation as a trigger. Simultaneously with the input of the trigger, the level of the output terminal V1 is varied from High (initial state) to Low, and subsequently successively varies the levels of the output terminals V2 to V5 from High to Low every time a fixed time t is counted (corresponding to time constant changing signal).

Next, the action of the fifth embodiment will be described with reference to FIG. 9. FIG. 9 corresponds to FIG. 4 showing the first embodiment. In FIG. 9, steps S1 and S8 of FIG. 4 are replaced by steps S1' and S8', and steps S20 to S26 are disposed in place of the steps S10 and S11. Furthermore the processing returns to step S4 after the step S8 is executed.

In step S1', the output level of the comparator 22 is set to Low under the initial state, however, the timer circuit 49 is in a reset state and all the five output terminals V1 to V5 are in low level. In this case, all the transistors 47$a$ to 47$e$ in the input signal processing circuit 46 are turned on. Accordingly, the circuit time constant of the input signal processing circuit 46 is determined by the resistance value achieved when all the resistance elements 48$a$ to 48$e$ are connected to the resistance element 31 in parallel, and the capacitance of the capacitor 33, which is set to the fastest $\tau 1$. The time constants $\tau 1$, $\tau 2$ in the fifth embodiment are assumed to represent time constants different from $\tau 1$, $\tau 2$ in the first embodiment for convenience of description.

As in the case of the first embodiment, the motor 2 starts to rotate and the starting current flows in MOSFET 7 (step S3), and when the current exceeds the slow start judgment value (step S4, "YES", step S5, "NO"), the output level of the comparator 22 is varied to High. At this time, all the five output terminals V1 to V5 of the timer circuit 49 are set to high level. In this case, all the transistors 47$a$ to 47$e$ in the input signal processing circuit 46 are turned off (step S8'). Accordingly, the circuit time constant of the input signal processing circuit 46 is determined by the resistance value of the resistance element 31 and the capacitance of the capacitor 33, and is set to the slowest $\tau 6$. Accordingly, occurrence of inrush current can be suppressed.

Subsequently, the rotational number of the motor 2 is very slowly increased under the state of the circuit time constant $\tau 6$ (slow start). When the current flowing in the motor 2 is reduced to the slow start judgment value of the comparator 22 or less (step S4, "NO"), the output level of the comparator 22 is varied from High to Low (step S20). At this time, if all the output terminals V1 to V5 of the timer circuit 49 are not set to low level (step S21, "NO"), the timer circuit 49 immediately varies the level of the output terminal V1 from High to Low, and starts its time counting operation of a fixed time t (step S22). At this time point, only the transistor 47$a$ is turned on, and thus the resistance value for determining the circuit time constant becomes a parallel resistance value of the resistance elements 31 and 48$a$, and the circuit time constant is set to $\tau 5$ ($<\tau 6$).

In subsequent steps S23 to S25, the timer circuit 49 successively varies the levels of the output terminals V2 to V4 from High to Low, and also counts the fixed time t. Accordingly, the circuit time constant is successively varied to a smaller value as the resistance elements 48$b$ to 48$d$ are successively connected in parallel ($\tau 2 < \tau 3 < \tau 4 < \tau 5$). In step S26, the level of the output terminal V5 is varied from High to Low, and the last transistor 47$e$ is turned on, so that the circuit time constant is equal to the minimum $\tau 1$ ($<\tau 2$).

As described above, according to the fifth embodiment, when the current level judging unit judges that the current detected by the current detecting unit exceeds the switching judgment value, the timer circuit 49 varies the level of the output terminal V1 from High to Low, and also starts the time counting operation. Furthermore, the timer circuit 49 successively varies the levels of the output terminal V2 to V4 from High to Low every time it counts the fixed time t, and successively turns on the transistors 47$a$ to 47$e$ constituting the time constant changing unit 51 to stepwise change the circuit time constant of the input signal processing circuit 46. Accordingly, the signal processing response can be more smoothly switched and the driving state of the load can be prevented from being drastically varied.

Sixth Embodiment

Figure 10:
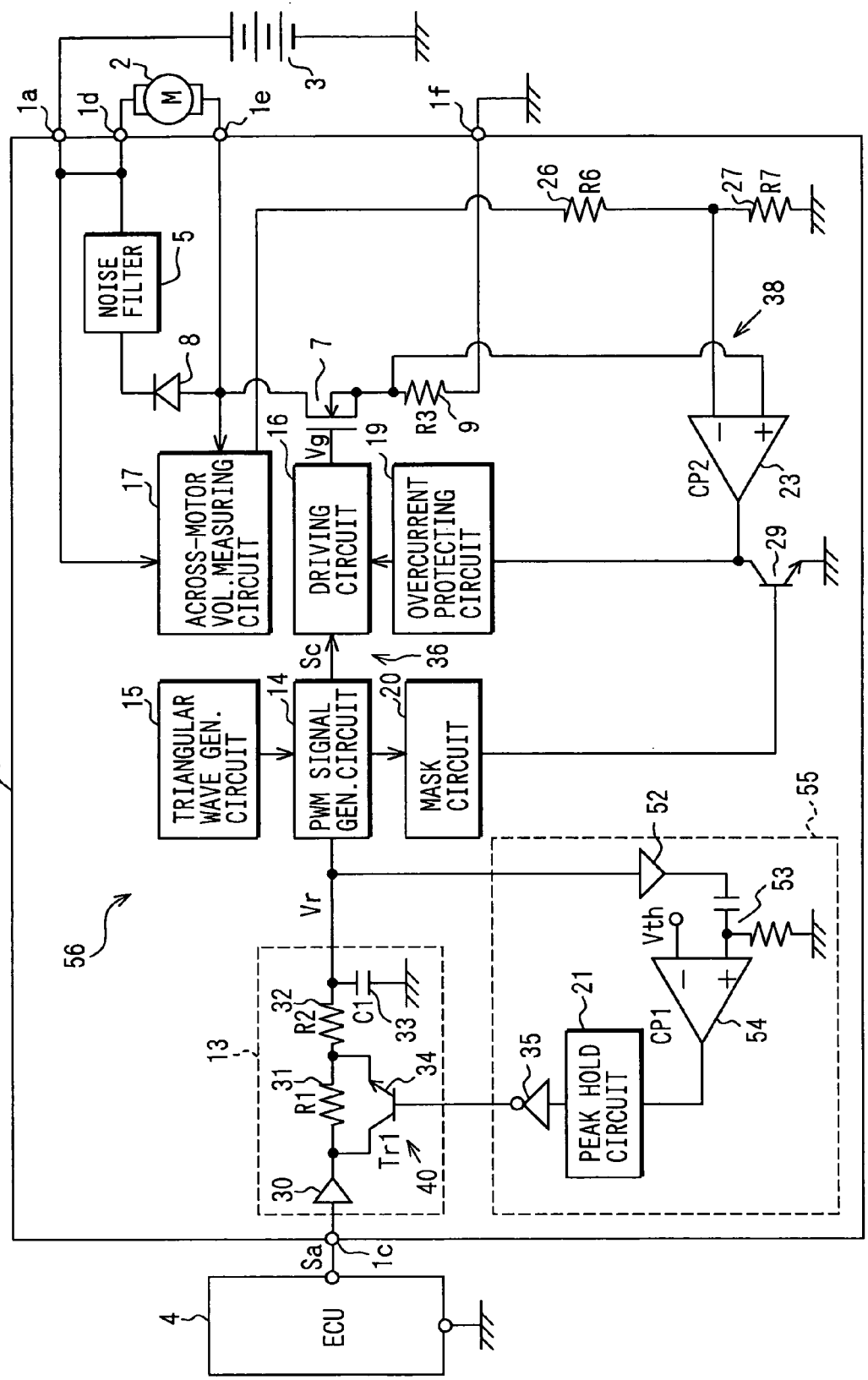
FIG. 10 is a diagram showing a sixth embodiment which corresponds to FIG. 1.

FIG. 10 shows a sixth embodiment, and only different parts from the first embodiment will be described. In the sixth embodiment, the transistor 28 and the current level judging unit 37 are eliminated from the FET controller 6 of the first embodiment. The output terminal of the input signal processing circuit 13 is connected to the input terminal of a differentiation circuit 53 constructed by a buffer 52, a capacitor and a resistance element.

The output terminal of the differentiation circuit 53 is connected to the non-inverting input terminal of a comparator (comparison circuit) 54, and a threshold value Vth is applied to the non-inverting input terminal of the comparator 54. The output terminal of the comparator 54 is connected to the input terminal of the peak hold circuit (output state holding circuit) 21. These elements constitute an instruction variation amount monitoring unit 55. The other construction is the same as the first embodiment. The above elements constitute the FET controller (semiconductor device controller) 56.

Next, the action of the sixth embodiment will be described. An instruction motor voltage Vr output from the input signal processing circuit 13 is differentiated by the differentiation circuit 53 of the instruction variation amount monitoring unit 55, and the output voltage level of the differentiation circuit 53 is increased in accordance with increase of the variation amount of the instruction motor voltage Vr (that is, the variation is sharp). When the output voltage exceeds the threshold voltage Vth, the output terminal of the comparator 54 is set to high level.

At this time, the time constant changing instruction is output to the time constant changing unit 40 through the peak hold circuit 21 and the inverter 35, and the transistor 34 is turned off, so that the circuit time constant of the input signal processing circuit 13 is set to τ1. The output voltage of the differentiation circuit 53 varies sharply, and thus the output voltage of the comparator 54 is only instantaneously set to high level. However, the time constant changing instruction keeps the output state for only a predetermined period by the action of the peak hold circuit 21. Furthermore, the action of the overcurrent judging unit 38 is completely identical to that of the first embodiment.

As described above, according to the sixth embodiment, the instruction variation amount monitoring unit 55 monitors the variation amount of the current supply instruction supplied from the ECU 4, and the time constant changing unit 40 changes the circuit time constant of the input signal processing circuit 13 in accordance with the monitoring result. Specifically, the instruction motor voltage Vr output from the input signal processing circuit 13 is differentiated by the differentiation circuit 53, and when the output voltage thereof exceeds the threshold value voltage Vth, the comparator 54 outputs the time constant changing instruction. Accordingly, when the current amount to be supplied to the motor 2 is about to increase sharply due to the current supply instruction, the circuit time constant is more increased, and thus the signal processing response is lowered.

Accordingly, the increase of the current supply amount is more moderated, and thus occurrence of inrush current can be suppressed as in the case of the first embodiment. Furthermore, the monitoring of the current supply instruction variation amount is carried out independently of the overcurrent judgment, and no influence is exerted on the operation of the overcurrent judging unit 38. Therefore, the same operation can be performed not only at the initial stage of starting the current supply, but also under the subsequent stationary operation. Furthermore, when the time constant changing instruction is output, the peak hold circuit 21 keeps the output state concerned for a fixed period, and thus the circuit time constant can be prevented from being drastically varied even when the output voltage of the differentiation circuit 53 is drastically varied.

The invention is not limited to the embodiments described above with reference to the drawings, and the following modifications may be made.

The peak hold circuit 21 may be provided as occasion demands.

P-channel type MOSFET or IGBT may be used in place of the N-channel type MOSFET 7.

The invention is not limited to the low side driving system, and it may be applied to a high side driving system.

The resistance element 9 may be located at any position where the current can be detected, for example, between the power source voltage and the load, between the load and MOSFET 7 or the like.

Two or more slow start judgment values may be set. In this construction, in the current area lower than the overcurrent judgment value, the increasing degree of the current at the slow start time, or the response speed to the DUTY signal Sa can be switched in a more multiple-step mode in accordance with the current value flowing in the motor 2.

The input signal is not limited to the PWM signal, and may be such a signal that supplies an instruction by varying the output interval or amplitude of a pulse signal.

In the portion of controlling MOSFET 7, feedback control may be carried out by referring to the across-motor voltage measured by the across-motor voltage measuring circuit 17.

In the fifth embodiment, the same judgment as the step S4 may be carried out as needed even while the steps S22 to S26 are executed. In this case, if "YES" is judged, the processing goes to step S5. Furthermore, the number of parallel connections of the transistor 47 and the resistance element 48 in the fifth embodiment may be properly varied.

The construction that the circuit time constant is varied in a multiple-step mode of three or more steps by using the signal output means like in the fifth embodiment is applied to the construction of the first embodiment.

The time constant changing unit 40a of the second embodiment may be applied to the sixth embodiment. Furthermore, the instruction variation amount monitoring unit 55 may be disposed in place of the current level judging unit 37 in the third and fourth embodiments.

The load is not limited to the fan motor 2 or other motors, and any load may be applied insofar as it is connected to the semiconductor device for driving in series and driven by a DC power source.

What is claimed is:

1. A semiconductor device controller comprising:
   an input signal processing circuit for carrying out signal processing of a pulse signal input as a current supply instruction from the outside on the basis of a circuit time constant to generate and output a control signal;
   a current supply control unit for controlling a conduction state of a semiconductor device connected to a load in series in response to the control signal to supply current to the load;
   a current detecting unit for detecting current flowing in the load;
   an overcurrent judging unit for comparing the current detected by the current detecting unit with an overcurrent judgment value to carry out an overcurrent judgment;
   a current limiting unit for limiting current to be supplied to the load through the semiconductor device by the current supply control unit when the overcurrent judgment is carried out by the overcurrent judging unit;
   a current level judging unit for comparing one or more switching judgment values set to be smaller than the overcurrent judgment value with the current detected by the current detecting unit to carry out a current level judgment;

a time constant changing unit for changing the circuit time constant of the input signal processing circuit in accordance with a judgment result by the current level judging unit; and a judgment result holding unit for holding the judgment result of the current level judging unit for only a predetermined time.

2. A semiconductor device controller comprising:

an input signal processing circuit for carrying out signal processing of a pulse signal input as a current supply instruction from the outside on the basis of a circuit time constant to generate and output a control signal;

a current supply control unit for controlling a conduction state of a semiconductor device connected to a load in series in response to the control signal to supply current to the load;

a current detecting unit for detecting current flowing in the load;

an overcurrent judging unit for comparing the current detected by the current detecting unit with an overcurrent judgment value to carry out an overcurrent judgment;

a current limiting unit for limiting current to be supplied to the load through the semiconductor device by the current supply control unit when the overcurrent judgment is carried out by the overcurrent judging unit;

a current level judging unit for comparing one or more switching judgment values set to be smaller than the overcurrent judgment value with the current detected by the current detecting unit to carry out a current level judgment; and a time constant changing unit for changing the circuit time constant of the input signal processing circuit in accordance with a judgment result by the current level judging unit, wherein the overcurrent judging unit and the current level judging unit set a judgment value of the current on the basis of a voltage applied to the load.

3. A semiconductor device controller comprising:

an input signal processing circuit for carrying out signal processing of a pulse signal input as a current supply instruction from the outside on the basis of a circuit time constant to generate and output a control signal;

a current supply control unit for controlling a conduction state of a semiconductor device connected to a load in series in response to the control signal to supply current to the load;

a current detecting unit for detecting current flowing in the load;

an overcurrent judging unit for comparing the current detected by the current detecting unit with an overcurrent judgment value to carry out an overcurrent judgment;

a current limiting unit for limiting current to be supplied to the load through the semiconductor device by the current supply control unit when the overcurrent judgment is carried out by the overcurrent judging unit;

a current level judging unit for comparing one or more switching judgment values set to be smaller than the overcurrent judgment value with the current detected by the current detecting unit to carry out a current level judgment; and a time constant changing unit for changing the circuit time constant of the input signal processing circuit in accordance with a judgment result by the current level judging unit, wherein the current supply control unit is designed so as to carry out PWM control on the semiconductor device, and equipped with a judgment result invalidating unit for invalidating the judgment results of the overcurrent judging unit and the current level judging unit for a period when the semiconductor device is shut off.

4. A semiconductor device controller comprising:

an input signal processing circuit for carrying out signal processing of a pulse signal input as a current supply instruction from the outside on the basis of a circuit time constant to generate and output a control signal;

a current supply control unit for controlling a conduction state of a first semiconductor device connected to a load in series in response to the control signal to supply current to the load;

a current detecting unit for detecting current flowing in the load;

an overcurrent judging unit for comparing the current detected by the current detecting unit with an overcurrent judgment value to carry out an overcurrent judgment;

a current limiting unit for limiting current to be supplied to the load through the first semiconductor device by the current supply control unit when the overcurrent judgment is carried out by the overcurrent judging unit;

a current level judging unit for comparing one or more switching judgment values set to be smaller than the overcurrent judgment value with the current detected by the current detecting unit to carry out a current level judgment; and a time constant changing unit for changing the circuit time constant of the input signal processing circuit in accordance with a judgment result by the current level judging unit, wherein the time constant changing unit is constructed by a resistance element inserted in a signal line in series and a second semiconductor device connected to the resistance element in parallel.

5. A semiconductor device controller comprising:

an input signal processing circuit for carrying out signal processing of a pulse signal input as a current supply instruction from the outside on the basis of a circuit time constant to generate and output a control signal;

a current supply control unit for controlling a conduction state of a first semiconductor device connected to a load in series in response to the control signal to supply current to the load;

a current detecting unit for detecting current flowing in the load;

an overcurrent judging unit for comparing the current detected by the current detecting unit with an overcurrent judgment value to carry out an overcurrent judgment;

a current limiting unit for limiting current to be supplied to the load through the first semiconductor device by the current supply control unit when the overcurrent judgment is carried out by the overcurrent judging unit;

a current level judging unit for comparing one or more switching judgment values set to be smaller than the overcurrent judgment value with the current detected by the current detecting unit to carry out a current level judgment; and a time constant changing unit for changing the circuit time constant of the input signal processing circuit in accordance with a judgment result by the current level judging unit, wherein the time constant changing unit is constructed by a series circuit of a resistance element and a second semiconductor device that is connected to a signal line in parallel.

6. A semiconductor device controller comprising:

an input signal processing circuit for carrying out signal processing of a pulse signal input as a current supply instruction from the outside on the basis of a circuit time constant to generate and output a control signal;

a current supply control unit for controlling a conduction state of a semiconductor device connected to a load in series in response to the control signal to supply current to the load;

a current detecting unit for detecting current flowing in the load;

an overcurrent judging unit for comparing the current detected by the current detecting unit with an overcurrent judgment value to carry out an overcurrent judgment;

a current limiting unit for limiting current to be supplied to the load through the semiconductor device by the current supply control unit when the overcurrent judgment is carried out by the overcurrent judging unit;

a current level judging unit for comparing one or more switching judgment values set to be smaller than the overcurrent judgment value with the current detected by the current detecting unit to carry out a current level judgment; and a time constant changing unit for changing the circuit time constant of the input signal processing circuit in accordance with a judgment result by the current level judging unit, wherein the current level judging unit includes a signal output unit for starting a time counting operation when the current level judging unit judges that the current detected by the current detecting unit exceeds the switching judgment value, and outputting a time constant changing signal every time a fixed time elapses, and wherein the time constant changing unit changes the circuit time constant of the input signal processing circuit stepwise every time the time constant changing signal is output.

7. A semiconductor device controller comprising:

an input signal processing circuit for carrying out signal processing of a pulse signal input as a current supply instruction from the outside on the basis of a circuit time constant to generate and output a control signal;

a current supply control unit for controlling a conduction state of a semiconductor device connected to a load in series in response to the control signal to supply current to the load;

a current detecting unit for detecting current flowing in the load;

an overcurrent judging unit for comparing the current detected by the current detecting unit with an overcurrent judgment value to carry out an overcurrent judgment;

a current limiting unit for limiting current to be supplied to the load through the semiconductor device by the current supply control unit when the overcurrent judgment is carried out by the overcurrent judging unit;

an instruction variation amount monitoring unit for monitoring a variation amount of the current supply instruction; and a time constant changing unit for changing the circuit time constant of the input signal processing circuit in accordance with a monitoring result of the instruction variation amount monitoring unit, wherein the instruction variation amount monitoring unit comprises:

a differentiation circuit disposed at the output side of the input signal processing circuit; and a comparison circuit for outputting a time constant changing instruction to the time constant changing unit when an output voltage of the differentiation circuit exceeds a predetermined threshold value.

8. The semiconductor device controller according to claim 7, further comprising an output state holding circuit for holding an output state of the time constant changing instruction when the time constant changing instruction concerned is output.

* * * * *